United States Patent [19]

Mizuhara

[11] 4,447,392

[45] May 8, 1984

[54] DUCTILE SILVER BASED BRAZING ALLOYS CONTAINING A REACTIVE METAL AND MANGANESE OR GERMANIUM OR MIXTURES THEREOF

[75] Inventor: Howard Mizuhara, Hillsborough, Calif.

[73] Assignee: GTE Products Corporation, Stamford, Conn.

[21] Appl. No.: 448,583

[22] Filed: Dec. 10, 1982

[51] Int. Cl.³ .............................................. C22C 5/06
[52] U.S. Cl. .................................................... 420/501
[58] Field of Search ............... 420/501, 580; 428/606; 228/263.12, 263.11, 263.13, 263.18, 263.19, 263.21

[56] References Cited

U.S. PATENT DOCUMENTS 2,141,113 12/1938 Peterson .............................. 420/501
2,195,307 3/1940 Hensel et al. ....................... 420/501

FOREIGN PATENT DOCUMENTS 52-20288 2/1977 Japan .................................. 420/501
52-30217 3/1977 Japan .................................. 420/501
55-138046 10/1980 Japan ................................. 420/501

Primary Examiner—L. Dewayne Rutledge
Assistant Examiner—Robert L. McDowell
Attorney, Agent, or Firm—Donald R. Castle

[57] ABSTRACT

Silver based brazing alloys containing controlled amounts of a reactive metal selected from titanium, vanadium, zirconium and mixtures thereof and a third metal selected from manganese, germanium and mixtures thereof are suitable for brazing ceramics, other non-metallic and metallic materials.

5 Claims, No Drawings

DUCTILE SILVER BASED BRAZING ALLOYS CONTAINING A REACTIVE METAL AND MANGANESE OR GERMANIUM OR MIXTURES THEREOF

FIELD OF INVENTION

This invention relates to brazing alloys. More particularly it relates to silver based brazing alloys containing a reactive metal and having a liquidus temperature above about 720° C.

BACKGROUND

Alloys containing titanium are known. These alloys contain relatively high levels of titanium. Generally the titanium content is above about 7% by weight. These alloys are not ductile and can not be rolled to a foil in a satisfactory manner and upon brazing contains a brittle dispersed phase is present.

SUMMARY OF THE INVENTION

Silver based alloys containing specified amounts of a reactive metal selected from the group consisting of Ti, V, Zr and mixtures thereof and a third metal selected from the group consisting of manganese, germanium and mixtures thereof have liquidus temperatures in the range of from about 720° C. to about 980° C.; are ductile and after brazing are relatively free of hard dispersed phases.

DETAILS OF PREFERRED EMBODIMENTS

For a better understanding of the present invention, together with other and further objects, advantages and capabilities thereof, reference is made to the following disclosure and appended claims in connection with the above description of some of the aspects of the invention.

The amount of the reactive metal in the silver based alloys of this invention, which also contain a third metal selected from Mn and Ge and mixtures thereof, can not appreciably exceed about 5% by weight and achieve a ductile material which upon brazing is free of dispersed phases.

The amount of reactive metal in the alloys of this invention is from about 0.25% by weight to about 5% by weight, with from about 2% by weight to about 4% by weight being preferred. By reactive metal, within the context of this disclosure, it is meant titanium, vanadium, zirconium and mixtures thereof. When vanadium or zirconium is the reactive metal, amounts of above about 2% adversely effect ductility therefore titanium is the preferred reactive metal.

The weight percent of the third metal which is selected from manganese, germanium and mixtures thereof, can vary from about 1% by weight to about 50% by weight. The preferred level is generally from about 4% by weight to about 20% by weight.

Various alloys are prepared by skull melting using a tungsten electrode and an argon atmosphere. The alloy is ductile and is rolled to a foil using an intermediate vacuum anneal. The thickness of the foil is of from about 2 to 6 mils.

The alloys composition and their flow temperatures are given in Table 1.

TABLE I

| Alloy | Element (% by weight) | | | | | | Brazing Temperature °C. |
|---|---|---|---|---|---|---|---|
| | Ti | Ag | Mn | Ge | V | Zr | |
| 1 | 2 | 86 | | 12 | | | 900 |
| 2 | 2 | 88 | 10 | | | | 1050 |
| 3 | 3 | 87 | 5 | 5 | | | 950 |
| 4 | 1.6 | 82.5 | | 15 | .9 | | 900 |
| 5 | 2 | 86 | 10 | | | 2 | 1050 |

These alloys can be used to braze ceramics, other non-metallic and metals and after brazing do not exhibit dispersed phases.

While there has been shown and described what are at present considered the preferred embodiments of the invention, it will be obvious to those skilled in the art that various changes and modifications may be made therein without departing from the scope of the invention as defined by the appended claims.

What is claimed is:

1. A brazing alloy consisting essentially of from about 0.25% to about 5% by weight of titanium, from about 4% to about 20% by weight of a third metal selected from the group consisting of germanium, manganese and mixtures thereof and the balance silver.

2. An alloy according to claim 1 wherein said third metal is germanium.

3. An alloy according to claim 1 wherein said third metal is manganese.

4. An alloy according to claim 2 consisting essentially of 2% by weight of titanium, 12% by weight of germanium, balance silver.

5. An alloy according to claim 3 consisting essentially of about 2% by weight of titanium, 10% by weight of manganese, balance silver.

* * * * *